United States Patent [19]

Ovshinsky

[11] 4,348,104
[45] Sep. 7, 1982

[54] DOUBLE EXPOSURE CONTROL FOR MICROFICHE RECORDING SYSTEM

[75] Inventor: Herbert C. Ovshinsky, Oak Park, Mich.

[73] Assignee: Energy Conversion Devices, Inc., Troy, Mich.

[21] Appl. No.: 227,941

[22] Filed: Jan. 23, 1981

[51] Int. Cl.$^3$ .............................................. G03B 27/52
[52] U.S. Cl. ....................................... 355/41; 355/45; 355/65
[58] Field of Search .................. 346/76 L; 355/40–43, 355/45, 53, 54, 64, 65

[56] References Cited

U.S. PATENT DOCUMENTS

| | | | |
|---|---|---|---|
| 3,288,025 | 11/1966 | Litz et al. ................................ | 355/41 |
| 3,873,213 | 3/1975 | Plumadorf ........................... | 355/41 X |
| 4,137,078 | 1/1979 | Izu et al. .......................... | 346/76 L X |
| 4,241,992 | 12/1980 | Flint et al. .............................. | 355/41 |
| 4,286,864 | 9/1981 | Lysle et al. .......................... | 355/41 X |

*Primary Examiner*—Richard A. Wintercorn
*Attorney, Agent, or Firm*—Lawrence G. Norris

[57] ABSTRACT

A reflection sensing apparatus detects the prior exposure history of an annotatable archival microfiche film card frame. A light source used to expose the microfiche to the record image is positioned to convert a reserved sensing area, which is outside the record image but within the frame, from an opaque and reflecting area to an irreversibly clear and transparent area upon exposure. The reserved area of the microfiche film card frame is interrogated by automatic photoreflection sensing immediately prior to exposure of a given frame to disclose its prior exposure history. Suitable warning systems indicate the imminence of multiple exposure, and an automatic disabling feature prevents accidental re-exposure. A manual override means controlled by the operator must be actuated to allow re-exposure of a previously exposed frame. An alternative pre-exposure sensing of the reserved area by optical transmission methods is described. The apparatus also serves to detect failure of the light source on initial exposure of a chosen frame by a second photoreflection sensing after exposure, or alternatively by transmission sensing during exposure.

19 Claims, 15 Drawing Figures

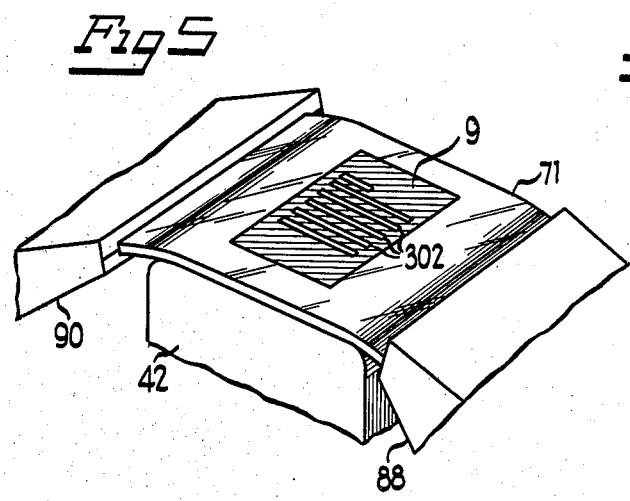
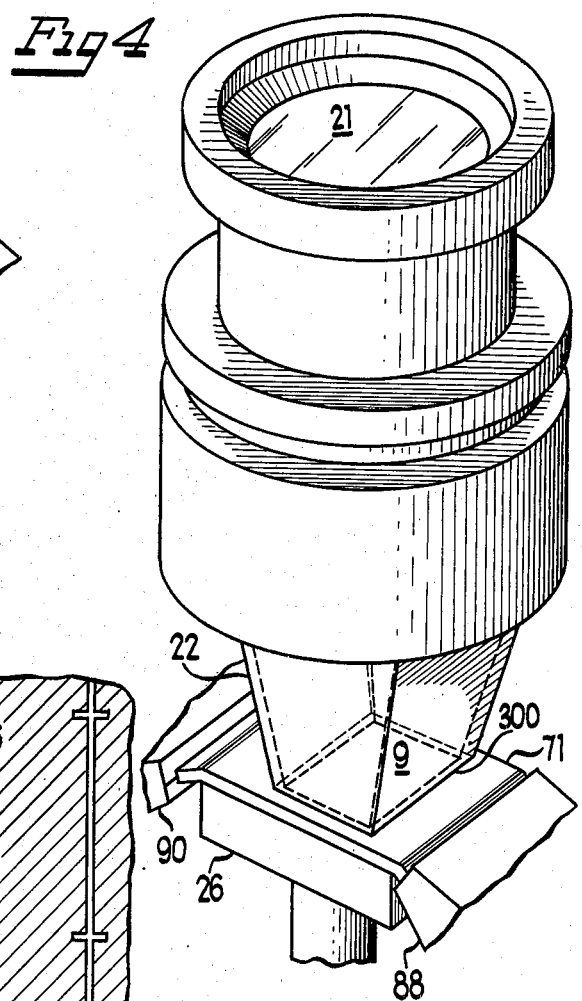
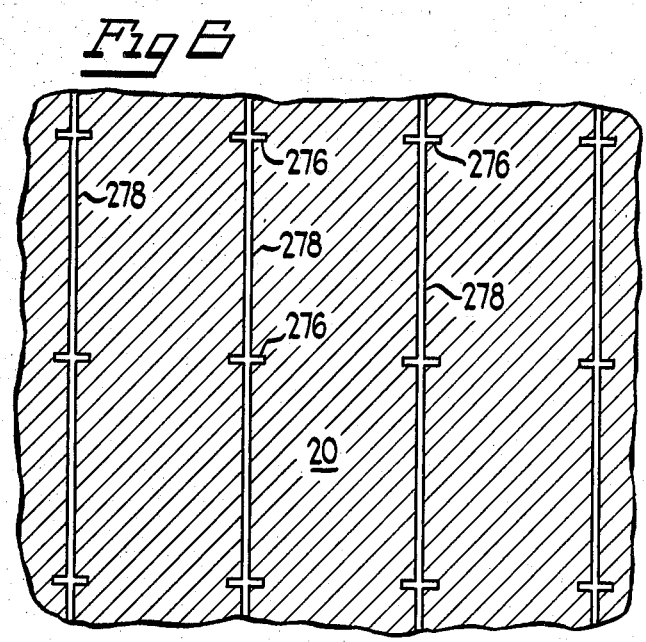
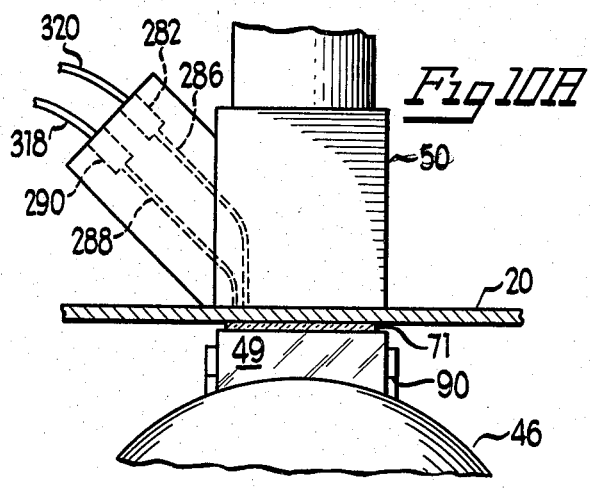
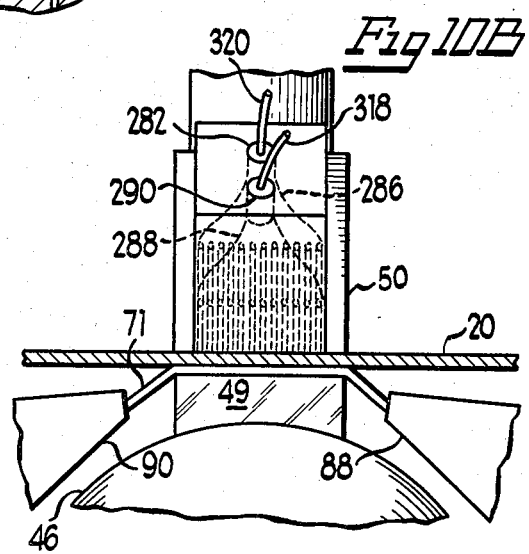

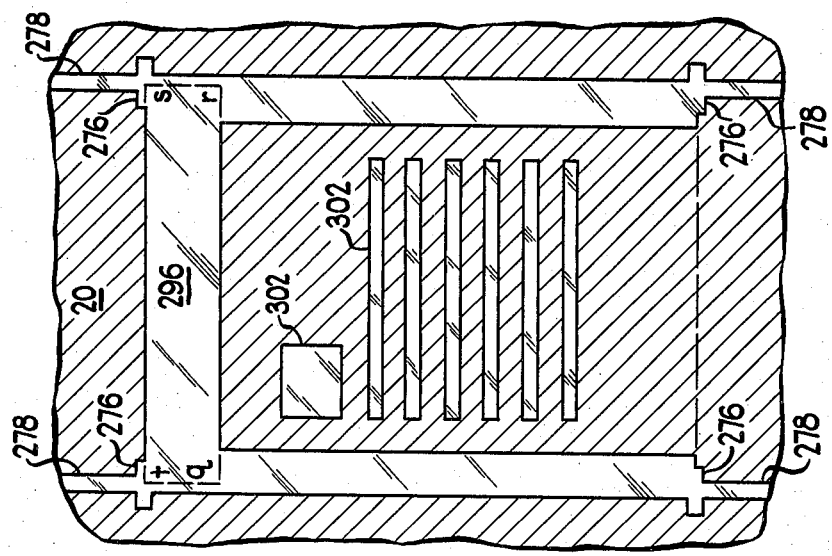
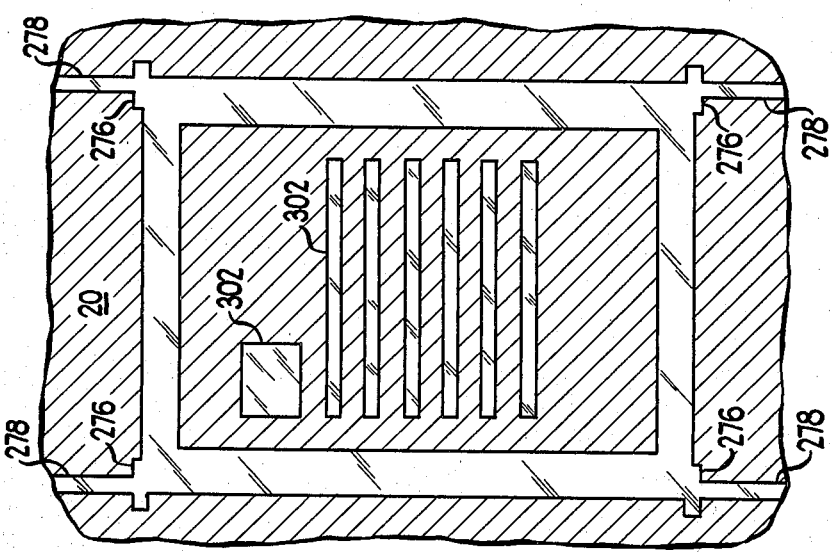
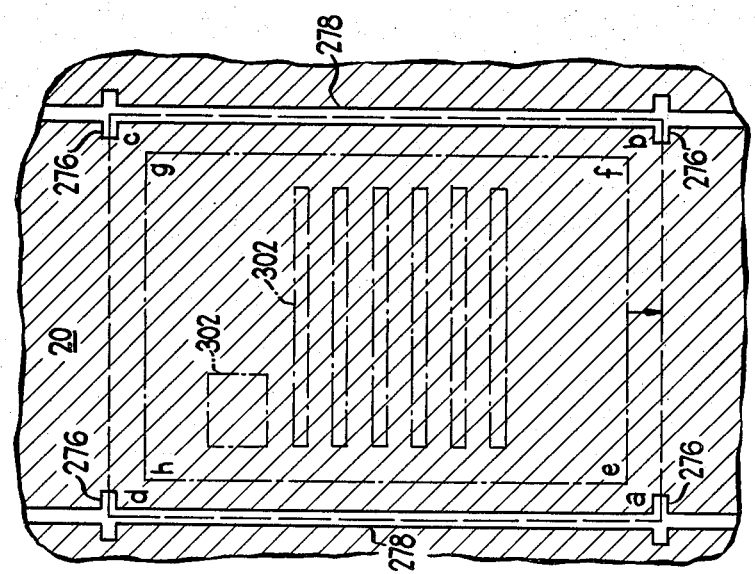

DOUBLE EXPOSURE CONTROL FOR MICROFICHE RECORDING SYSTEM

BACKGROUND OF THE INVENTION

The present invention relates to apparatus for automatic prevention of unintended double exposure in annotatable archival microfiche recording systems employing an intermediate film to carry a record image from an imaging station to a transfer station where the microfiche film card receives the record image. The invention also relates to use of said apparatus to warn of failure to transfer the image.

There has been developed by the applicants and co-workers an archival hard copy microfiche recording system which reflects light off of a document placed on a document-receiving platform and projects an image of it in greatly reduced form onto an initially transparent intermediate dry silver film strip carried by a film head unit. The film strip is dispensed from a cassette mounted on the film head, and is fed by film advancing means to an imaging region where a selected area of the film strip to be exposed can receive the projected light image. A pressure element presses the selected area of the film strip against a planar backing aperture defining a projection plane and an imaging area, and the film is then exposed to the light image. The film head is next moved along guides from the imaging station to a developing station, where a hot shoe pressing against the exposed area of the film causes development of the image to form an opaque image in the exposed areas thereof. The film head is then moved to an image transfer station, where the image on the dry silver film is to be replicated on a positive initially opaque microfiche film card of the photo-developing type (See U.S. Pat. No. 4,137,078 issued June 30, 1979 to Izu and Ovshinsky). The microfiche card is held indexed on a movable carriage so that a predesignated frame of the card receives the image on the intermediate film. A pressure element presses the film card and the intermediate film strip together between the output prism of a flash lamp housing and a backing plate. Image transfer is accomplished by energizing the flash lamp to direct light through the intermediate film, immediately rendering transparent the previously opaque areas struck by the high intensity flash lamp light on the selected frame of the microfiche film card. To replicate a new image the film head is returned to the imaging station, where the cycle is repeated.

The microfiche card may be examined via a "read" mode of the system. With the film head positioned away from the imaging lens, the microfiche film card carriage, which is accurately locatable in x and y directions by means of an indexing system, is moved on a track to a station under the lens. An illumination system is moved next to the microfiche film card carriage and then the chosen frame of the card is projected back to the document receiving area.

The system also possesses the capability of "annotating" or "updating" existing records stored on the microfiche film. This arises from the nature of the two film systems used. The intermediate film is of the reversal type; dark areas on the chosen hard copy replicate as transparent areas and light areas replicate as opaque upon development. Hard copy having black lettering on a white page will thus replicate on the intermediate film as an opaque rectangle with transparent letters. The microfiche film, however, is an initially opaque photodeveloping positive film which is rendered irreversibly transparent where struck by high intensity light during flash exposure. Thus, dark markings on the original document replicate as irreversibly transparent images on an otherwise still opaque microfiche film frame. These remaining opaque regions on the microfiche film remain "annotatable", i.e. convertible in that they can be rendered transparent by a subsequent flash exposure. It is this aspect of the microfiche film that allows for updating of microfiche records. As used throughout this disclosure and in the appended claims the term "annotatable" will be understood to refer to a film that is capable of accepting a second image after exposure and development of a first image in the same general region.

Thus, if a copy of a document is imaged on a microfiche film card frame where the indicia on the document are dark lines on a light background, these dark lines are now stored as irreversible clear lines on the microfiche film card. To update the microfiche film card with new entries in a specified still convertible area of a microfiche film card frame one prepares on intermediate film a fresh image consisting of the new entries only. This is accomplished by using as a source for the new image a dark-line record on a white background placed on the document receiving platform, e.g. typewritten black text on white paper. The new image, consisting after development solely of transparent new entries on an otherwise opaque imaging area, is then replicated at the transfer station onto the microfiche film card frame. These new entries are thus replicated as additional irreversible clear indicia on the selected frame. Proper registry of the new record is achieved by using the "read" mode of the system to assist in orienting the new entries on the document receiving platform before the intermediate film is exposed to receive the new image. Here an image of the chosen frame to be updated is projected back onto the document receiving platform, using the "read" mode previously described. A white sheet of paper bearing the new record indicia is then placed on the document receiving platform and moved around until the new indicia are properly positioned with respect to the projected image of the microfiche film card. The frame is now updated by carrying out a conventional "record" cycle, i.e. the microfiche film card is returned to the transfer station, the film head is moved to the imaging station, whereupon the image of the new record indicia is projected, exposed, developed, and replicated onto the microfiche film card frame at the transfer station.

Such annotatable systems are inherently vulnerable to record wipeout by an unintended second exposure; accidental selection by the operator of an exposed microfiche film card frame in the belief that it is a fresh one can result in the superposition of a new record image over an old one, with concomitant obliteration of the old record. It is an object of this invention to provide a sensing means to distinguish between fresh frames and exposed ones, and to provide automatic prevention of accidental multiple exposure thereby.

It is equally basic to archival systems that a failure of the system to produce a record image on the microfiche film card be immediately communicated to the operator. In practice this is generally a result of failure of the flash lamp to fire. It is another object of this invention to provide sensing means to detect automatically such a flash failure.

SUMMARY OF INVENTION

In accordance with one of the features of the invention there is provided in an annotatable microfiche film recording system like that previously described means for sensing the reflectivity of a chosen sensing area on a selected microfiche frame, where the sensing area is disposed external to the image of the record copy. Illumination means are provided to render the sensing area irreversibly transparent by photo-development during the process of replicating the intermediate film image of the record copy on the microfiche frame. Control means responsive to the sensing means are provided to disable the source of illumination employed for the replication process when a clear nonreflecting sensing area is detected, thereby preventing accidental double exposure of the microfiche frame.

A specific feature of the invention comprises making the sensing means in the form of a light source and a photodetector to sense the reflectivity of the sensing area.

Another specific feature of the invention comprises incorporating the light source and photodetector into the backing element used during the replication process.

In accordance with another feature of the invention, an operator controlled override of the disabling permits the subsequent double exposure necessary for annotating or updating a frame.

A further feature of the invention comprises providing an alarm means responsive to the control means so as to warn the operator that the frame chosen has a prior image on it.

In accordance with another feature of the invention the sensing means includes a light sensing means disposed to detect the passage of the light from the source of illumination employed in the replication process through the sensing area. Failure to detect a light pulse, even during the initial exposure, indicates failure of the source of illumination. Control means responsive to failure to detect such a pulse are provided. An alarm means responsive to the control means are provided to warn the operator of illumination failure.

In accordance with another feature of the invention illumination failure during exposure of a previously unexposed frame is achieved by a second reflection sensing after exposure. Detection of a reflecting sensing area during this second sensing is indicative of illumination failure. Similar control and alarm means serve to warn the operator.

Other objects, advantages, and features of the invention will become apparent upon making reference to the specification to follow, the drawings, and the claims.

DESCRIPTION OF DRAWINGS

FIG. 4 is a perspective view of the lens shroud and backing pad in position at the imaging station for initial imaging of the intermediate film;

FIG. 5 is a perspective view of the developed recorded image on the intermediate film after development by the hot shoe at the developing station;

FIG. 6 is a plan view of a portion of an initially opaque microfiche film card, showing pre-formed indexing markings;

FIGS. 8A–8C are plan views showing the effects of superposition of intermediate film image, microfiche indexing markings, and flash prism boundaries in two embodiments of the invention.

FIGS. 10A and 10B are partially sectioned side and front elevational views respectively of a portion of the film head in position for image transfer to the microfiche card, and show the sensing foot in place for image sensing and flash detection.

DESCRIPTION OF EXEMPLARY FORM OF THE INVENTION

Figure 1:
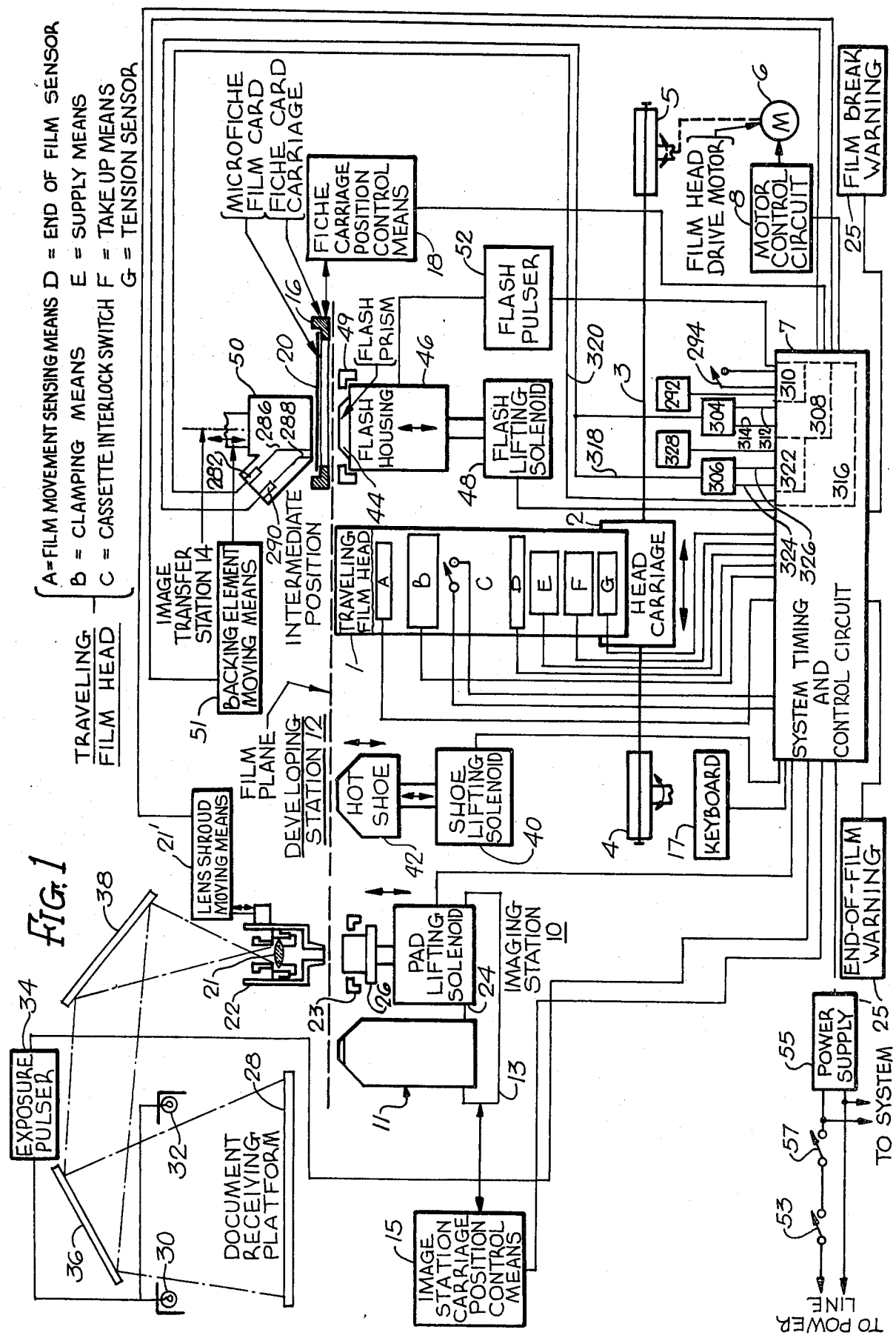
FIG. 1 is a block diagram of the control circuitry of the microfiche recording system and the optical sensing system of the invention.

FIG. 1 includes a block diagram of the control system for sequencing the operation and movement of an intermediate film head 1 and head carriage 2 between various stations of a microfiche recording system. The head carriage is advanced to the various stations illustrated in FIG. 1 by tension in a belt 3 extending between an idler pulley 4 and a motor driven pulley 5. A pulley drive motor 6 is controllably driven in both directions by a system timing and control circuit 7 operating through a motor control circuit 8. The stations illustrated are an imaging station 10, where the exposed area of the initially transparent intermediate film strip on the film head 1 is exposed to a light image, such as light reflected off of a hard copy, a heat-applying developing station 12 where the light-exposed areas of the intermediate film are rendered opaque, and an image transfer station 14. A microfiche film card carriage 16 at the image transfer station 14 positions, under control of a fiche carriage position control means 18, a selected frame of a microfiche film card 20 for reception of an image last formed on the film strip carried by the film head 1. The microfiche film card 20 is preferably made from a photo-developing initially opaque archival film of the dispersal type disclosed in U.S. Pat. No. 4,137,078 issued to Izu and Ovshinsky, wherein a transferred image is formed automatically upon exposure to a high intensity flash of radiant energy, such film being completely insensitive to exposure to normal room ambient light or even direct sunlight. The film carried by the film head is preferably more light sensitive and is latently imaged by the relatively less intense light reflected and imaged from hard copy. The intermediate film carried by the film head is preferably a dry-silver heat-developed film.

As used herein, the term film head refers to a frame removably attached to a carriage, and a film supply unit removably mountable on the frame. The film head 1 carries a film supply means E, a film takeup means F, and a film clamping of holding means B. In various embodiments of the invention all three are sequentially controlled by the system timing and control circuit 7. For example, the supply means E may include a supply reel or cassette, and various guide rollers as well as film driving means where the supply reel is to be driven. The takeup means F may include a takeup reel and guide roller means as well as film tensioning means and takeup reel drive means. In addition, the film head may include an end-of-film sensor D which may respond to a marking on the film. The film head may also include a tension sensor G responsive to tension in the film. The end-of-film sensor D and tension sensor G perform control functions which respond to end-of-film or film breakage and disable operation of the system under these circumstances. A film break warning means 25 and an end-of-film warning means 25' serve to warn the operator of such situations. The film head 1 may also include a film head interlock switch C which communicates the status of a light sealed film dispenser cover to the system timing and control circuit 7, so that the system cannot be operated with the cover open and the film inside thus subject to light fogging.

Figure 7A:
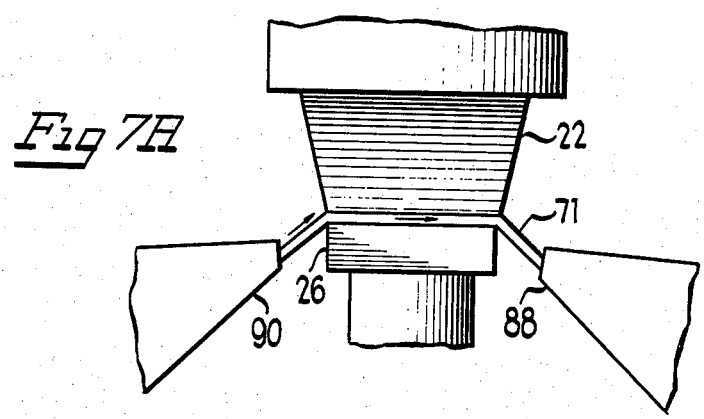
FIGS. 7A–7C are elevational views of the imaging region between the payout and takeup lips of the intermediate film head of FIG. 2 at the imaging, developing, and transfer stations.

Initially, the film head 1 is moved to the imaging station 10, where an imaging area of the film strip is placed under a projection lens 21 contained in a lens shroud 22 (see FIG. 7A). The film clamping means B is actuated to a film release condition and an area of fresh intermediate film strip is advanced into the imaging area by driving the supply or takeup means E or F. Payout length is governed by the film movement sensing means A, which effects generation of electrical signals measuring the length of film payout to the system timing and control circuit 7, the number of which measures the payout length. After the requisite film advance, the system timing and control circuit 7 stops driving of the film supply or takeup means E or F and actuates the clamping or holding means B back to a film holding condition, whereupon a signal from the system timing and control circuit 7 raises a backing pad 26 up against a pad limit stop 23. A subsequent command from the system timing and control circuit 7 actuates a lens shroud moving means 21' to lower the lens shroud 22 to clamp the intermediate film between the backing pad 26 and the base of the lens shroud 22. A document receiving platform 28 is next illuminated by flash lamps 30 and 32 energized by the exposure pulser 34 on command from the system timing and control circuit 7, the image of the platform and its contents being relayed to the projection lens 21 by two mirrors 36 and 38. On command, the pad lifting solenoid 24 drops the backing pad 26, and the lens shroud moving means 21' lifts the lens shroud 22, thereby releasing the film. The film head 1 is now moved to a developing station 12, where a shoe lifting solenoid 40 controlled by the system timing and control circuit 7 raises a hot shoe 42 (see FIG. 7B) against the imaging area 9 (see FIG. 2) of the film strip 71 for a predetermined length of time set by the system timing and control circuit 7, whereupon the shoe lifting solenoid 40 drops the hot shoe. The film head 1 is then moved to a position which places the imaging area 9 of the film strip over a flash prism 44 on a flash housing 46. A selected frame of a microfiche film card 20 on a microfiche card carriage 16 is moved into appropriate position over the flash housing 46 with the system timing and control circuit 7 controlling the microfiche carriage position control means 18. The desired frame of the microfiche film card 20 is selected by operation of keys of a keyboard 17 which cause the control circuit 7 to operate the microfiche carriage position control means 18. On command of the system timing and control circuit 7, a flash lifting solenoid 48 raises the flash housing 46 against a limit stop 49. A backing element 50 is lowered by the backing element moving means 51 so as to press the imaging area of the intermediate film strip into intimate contact with the microfiche film card 20 and a backing element 50 (see FIG. 7C). Image transfer is achieved by triggering the flash tube (not shown) in the flash housing 46 by a command from the system timing and control circuit 7 operating through a flash pulser circuit 52. Immediately after exposure, the lifting solenoid 48 drops the flash housing 46, and the backing element moving means 51 raises the element 50, thereby releasing the two films.

The pad lifting solenoid 24 and a projection light source 11 are mounted on an image station carriage 13. A station carriage position control means 15 is commanded by the system timing and control circuit to position either the pad lifting solenoid 24 or the projection light source 11 under the lens 21. For reading or updating a microfiche the fiche card carriage 16 is moved by the fiche carriage position control means 18 to a position under the lens 21, and the projection light source 11 is moved into position below it so as to project the image on the microfiche back onto the document receiving platform 28 for inspection and, where an add-on of information is to be made on the frame of the microfiche card involved, an overlay of the added information can be properly positioned over the projection image. The recording system carries out the desired "read", "record" and microfiche frame positioning operations as commanded by the operator by depressing the appropriate keys on a keyboard 17 connected to the system timing and control circuit 7. The system timing and control circuit is powered by a power supply 55 connected to the power line by a main power switch 53 and a system interlock switch 57 actuated to an open position by opening a system access door (not shown). In the exemplary form all sequencing and sensing operations are carried out by a program stored in a minicomputer memory, the minicomputer constituting a portion of the system command and control circuit 7. Computer control is not, however, essential to the claimed subject matter of this disclosure; manual switch sequencing of conventional circuitry could alternatively be employed.

Figure 2:
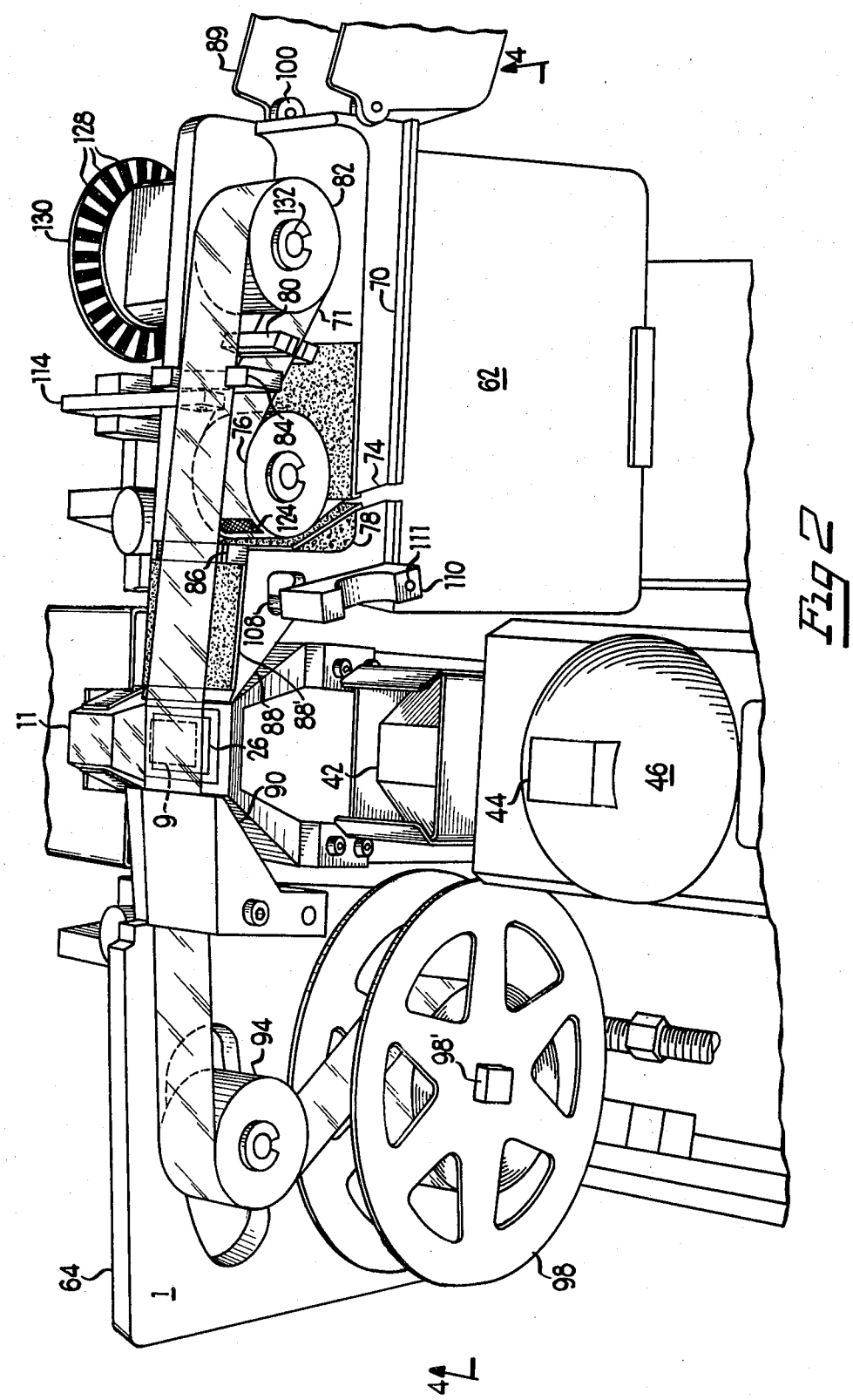
FIG. 2 is a perspective view of a traveling film head including an intermediate film dispensing cassette positioned at the imaging station with a film head cover in the open position to show details of the film dispensing system.
Figures 3, 9:
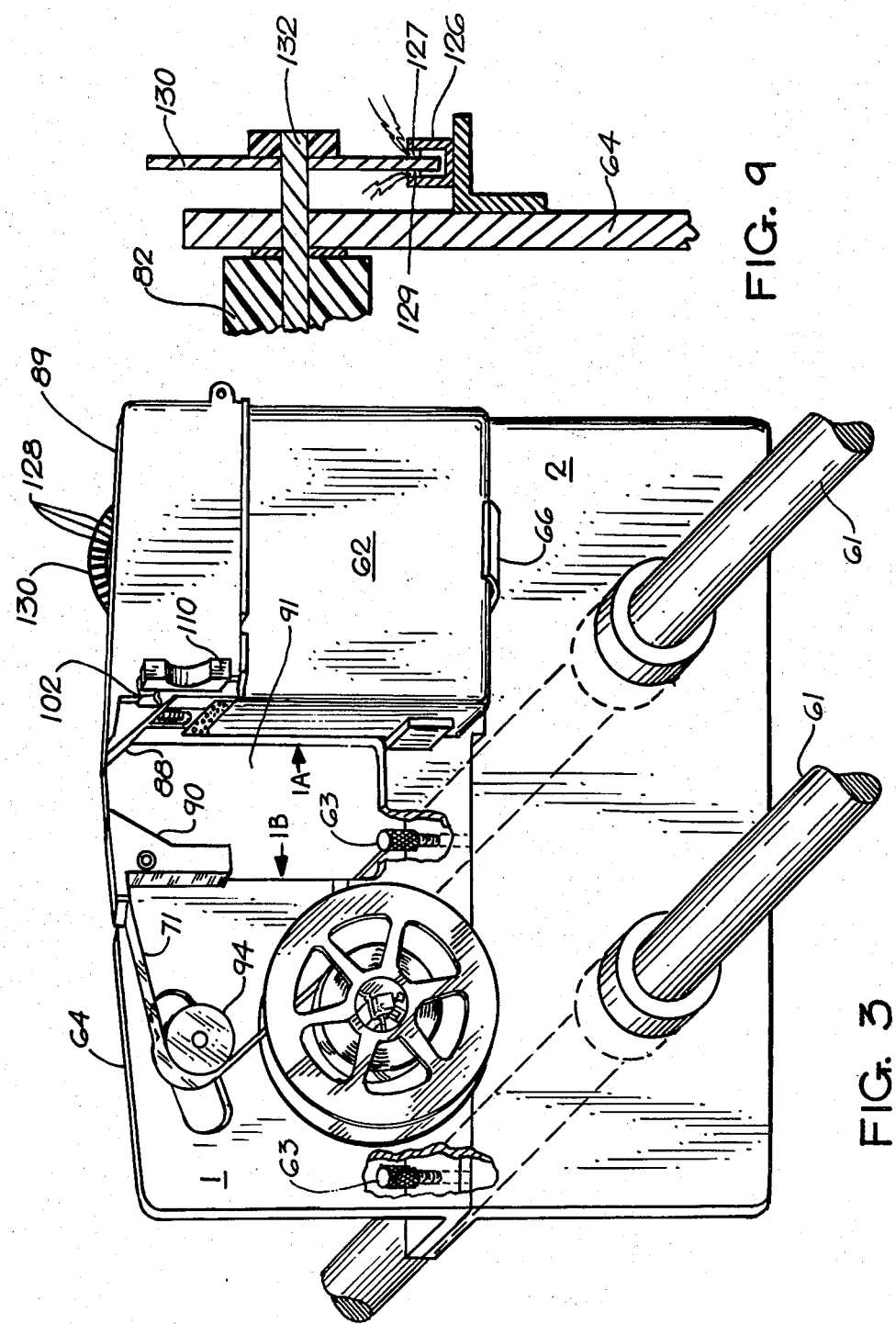
FIG. 3 is a perspective view of the traveling film head and a carriage therefor movably mounted on guides.
FIG. 9 is a side sectional view of the film advance sensor and encoder wheel assembly of the film head.

Refer now to FIGS. 2 and 3 which show the details of an exemplary film head 1. FIG. 3 shows the traveling film head 1 removably mounted as by screws 63 on the carriage 2 guided for horizontal movement on guide rods 61. FIG. 2 shows the film head positioned at the imaging station 10. The backing pad 26, the hot shoe 42, the flash prism 44, and the projection light source 11 are also shown. The film head is shown as including a film supply section 1A including a removable film dispensing cassette 62 mounted on a film head frame 64 and held in position by a cassette support ledge 66. The intermediate film strip 71 exits the cassette through a slot 74 in a top ledge 70, passing next around an idler roller 76 where it presses against a compliant friction pad 78 which places a drag force on the film, and thence through an end-of-film sensor unit 80. The film strip 71 then passes around an encoder roller 82 and back over a film clamp lifter 84, then over a clamping block 86 where it then exits the film supply section between a payout lip pad 88' and a pad (not shown) mounted on a film head cover 89 and over a payout lip 88, where one frame width of the film strip is exposed for external processing at what may be called an imaging area of the film head.

In this embodiment the film holding or clamping function is achieved by a short clamp blade (not shown) mounted inside the cover 89. When the cover 89 is closed, the blade presses down on the film strip 71 to pin it to the clamping block 86. The cover 89 is tensioned down by a loading spring (not shown). Clamping release is achieved by a solenoid (not shown) drawing down the exterior end of a pivoted lift bar 114, thus raising the interior end of the lift bar carrying the film clamp lifter 84 so as to force the lifter into contact with the interior face of the cover 89 against the force of the loading spring. This raises the cover 89 sufficiently to raise the clamp blade out of its film engaging position, thereby releasing the film strip 71.

The frame 64 has a large open region 91 between the film supply section 1A and the film takeup section 1B of the film head. This open region receives the backing pad 26, hot shoe 42 and flash housing 46 at the imaging, developing and image transfer stations 10, 12 and 14. The film passes over a takeup lip 90 on the takeup side of the imaging area and then proceeds over a dancing roller 94 carried on an arm 95 tensioned by a spring 93 which forces the roller away from the takeup lip 90, and serves to keep the film under tension. The film then winds on a motor driven takeup reel 98 driven by a takeup motor (not shown) mounted on the frame 64. The takeup reel 98 is mounted on a drive shaft 98' which makes connection to the motor in any suitable way, such as by a pulley belt coupling so that the entire film head 1 can be removed from the carriage 2, as by removing the screws 63—63 and raising the film head therefrom, where the film can be threaded through the film head conveniently away from the carriage.

FIG. 9 shows details of an intermediate film feed control means incorporated in the film head and shown in the drawings. This means responds to rotation of the encoder roller 82, the rotation of which is detected by a light sensing unit 126 mounted on the frame 64, and which monitors the passage of opaque interruptor lines 128 on a transparent encoder wheel 130 attached to the outboard end of the encoder roller shaft 132, the wheel, shaft, and roller being rigidly interconnected. The passage of a line 128 interrupts a light beam from a light source 127 to a photodetector 129. The series of light pulses detected by the light sensing unit is transmitted to the system timing and control circuit 7 as the intermediate film pays out over the encoder roller 82 during film advance. The pulses are counted by the system timing and control circuit 7. When the count reaches a predetermined value the system timing and control circuit 7 terminates power to the film advance motor (not shown), which drives the takeup reel 98. Film breakage during the film advance process causes loss of tension in the intermediate film 71, resulting in loss of friction contact between the film and the encoder roller 82. The encoder roller ceases to turn, and the sensing pulses cease as a result. Cessation of such pulses during a film advance cycle causes the system timing and control circuit 7 to abort the cycle and actuate a film break warning 25.

Figure 7B:
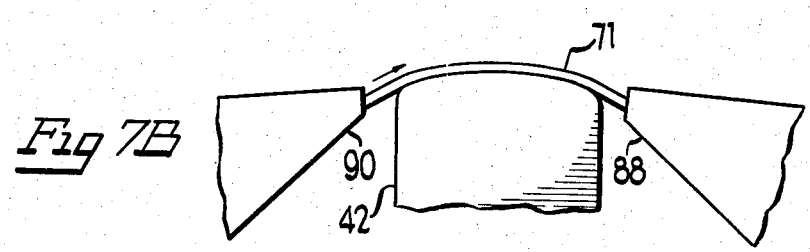
Figure 7C:
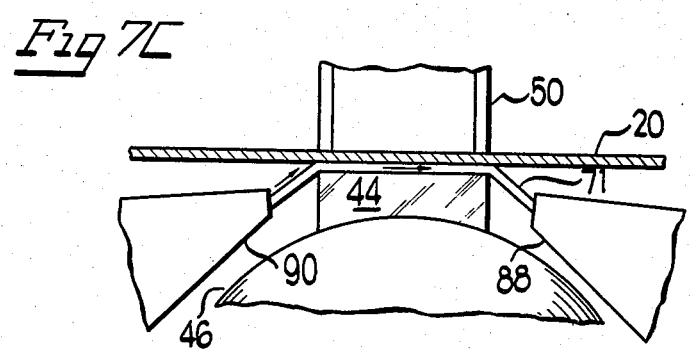

FIGS. 7A through 7C are front elevational views of the film head 1 in the region of the imaging area of the film head during image exposure (FIG. 7A), development (FIG. 7B), and image transfer (FIG. 7C). Since the intermediate film 71 is rigidly clamped internally on the payout side, the film is fixed in position at the payout lip 88. However, the compliant tensioning of the film by the spring loaded dancing roller 94 on the takeup side permits a slight film payout to take place on the takeup side as shown by arrows in FIGS. 7A, 7B, and 7C when the backing pad 26, hot shoe 42 and flash housing 46 are raised into position. This prevents breakage of the intermediate film 71 under the forces involved.

To accomplish one of the objects of the invention, double exposure prevention, the backing element 50 (see FIG. 7C) employed at the transfer station 14 preferably includes photosensing means, as shown in FIGS. 1, 10A and 10B. When the microfiche card 20 and the intermediate film strip 71 are pressed into contact for image transfer as shown in FIGS. 10A and 10B the exposure monitor circuit 316, a subunit of the system timing and control circuit 7, proceeds to interrogate the chosen microfiche frame. A light source 282, preferably a light emitting diode, in the backing element 50 is energized via a power lead 320. Light from the source 282 is conducted by a linear array of light pipes 286 to illuminate a reserved sensing area 296 (qrst in FIG. 8C) on the microfiche film card 20. As will be shown subsequently, if the chosen frame on the microfiche card has undergone a prior exposure, this sensing area qrst will be clear instead of opaque and reflecting. An unexposed frame will thus reflect light back from the sensing area into a parallel second linear array of light pipes 288 to a photodetector 290 connected by a signal lead 318 to two exposure monitor circuit peripheral one-bit latches (preferably simple resettable flip-flop circuits) 306 and 304. Immediately before the energization of light source 282, the double exposure warning circuit 308 clears the latch 304 by pulsing the reset line 312, resulting in a logical "0" (zero) as the state of the latch sensing line 314. Upon energization of the light source 282, a reflection sensed by the photodetector 290 will send a signal pulse via lead 318 which changes the state of latch 304 and puts sensing line 314 in a "1" state. A program-controlled branching stored in the memory of the system timing and control circuit controls program flow according to the state of the sensing line 314. Before the program will sequence to allow a trigger pulse to be sent to the flash pulser 52 a "1" must be sensed on the sensing line, indicating a reflecting sensing area qrst and hence the presence of a previously unexposed frame. If the frame has been previously exposed, the sensing area will be clear and no light pulse will be reflected to the photodetector 290, in which case the sensing line 314 remains in a "0" state. If a "0" is detected on the sensing line the program branches to cause a double exposure circuit 310 to actuate a double exposure warning means 292 which alerts the operator and causes the program to abort the remainder of the cycle. If the choice of an exposed frame was erroneous, the operator simply selects another frame by means of the keyboard control 17 and the interrogation process is repeated after the microfiche card 20 is repositioned. If multiple exposure of a chosen frame is desired, as is always the case with annotating or updating, the operator actuates a manual override switch 294, which is sensed during program execution to cause the program to ignore preexposure sensing during the replication cycle.

Alternatively, the initial prior exposure history sensing may be done by transmission sensing. With the microfiche film card 20 and intermediate film strip 71 in contact for image transfer, a weak pulse from the flash pulser 52 causes a low intensity light flash to irradiate the two films. The flash pulser power is adjusted by means well known to the art to cause the output of the flash lamp (not shown) in the flash housing 46 to be well below the threshold necessary to photodevelop the film card 20. This light pulse will only be detected by the photodetector 290 if the sensing area 296 (see FIG. 8C)

is clear, indicating a prior exposure has occurred for that frame. Implementation of suitable control logic follows the outlines previously set forth herein. In this embodiment the light source 282 is unnecessary.

Either embodiment will serve to warn of imminent double exposure. However, the transmission sensing method is vulnerable to failure if the flash lamp becomes erratic with age and fails to fire during the sensing operation.

The sensing area qrst (see FIG. 8C) is positioned so that upon first exposure of any frame, the sensing area will be rendered irreversibly clear by and during the course of the exposure. Moreover, even on first exposure a trailing fraction of the light pulse from the flash housing 46 will pass through the sensing area. This latter feature will be employed to accomplish the second object of the invention, and will be discussed subsequently in one embodiment of the invention.

The sensing area qrst (see FIG. 8C) is reserved by properly indexing the imaging area 9 (see FIG. 2) on the intermediate film 71 to framing bars and stripes on the microfiche film card 20. FIG. 6 shows a portion of microfiche film card 20 with clear transparent framing bars 276 and framing stripes 278 thereon, the remainder of the area of the card being opaque reflecting photodeveloping film. Such marks are placed on the microfiche film card during manufacture to identify a given frame by assigned row and column indices. Referring to FIG. 4, the interior boundary 300 of the base of the lens shroud 22 sets the perimeter of the light field passing therethrough, and establishes the boundaries of the record copy imaging area 9 on the intermediate film 71. Regions external to the imaging area 9 on the intermediate film strip 71 are thus protected from exposure and are clear after development. FIG. 5 shows a perspective partial view of the film head 1 and imaging area 9 of the intermediate film 71 after development by the hot shoe 42. In this illustration the image of the record copy with transparent text indicia 302 is shown as filling the entire available area.

FIGS. 8A, 8B, and 8C show the evolution of the preferred procedure for reserving a sensing area (qrst in FIG. 8C) on the microfiche film card 20. The flash prism 44 is dimensioned such that when in contact for image transfer its outer boundaries, denoted by rectangle abcd of FIG. 8A, are located precisely within the microfiche frame markings consisting of the four framing bars 276 and the two framing stripes 278. Only those regions within abcd are thus susceptible to exposure. If the imaging area 9 on the intermediate film, denoted by the smaller rectangle efgh in FIG. 8A, is centered in the chosen frame, then flash illumination during image transfer will result in the intermediate areas between the margins of these rectangles being rendered clear, as shown in FIG. 8B. Any of these clear areas may be used for exposure sensing. However, in the exemplary form of the invention an enlarged sensing area is achieved by offsetting the imaging area 9 such that its lower boundary ef is placed to be substantially coterminal with the flash prism boundary ab, as indicated by the arrow in FIG. 8A. Subsequent exposure results in a larger sensing area 296 (denoted by rectangle qrst) as shown in FIG. 8C.

Alternative embodiments may be employed wherein the sensing areas corresponding to each of the frames lie wholly outside the frame region of the microfiche film card 20, e.g. on the peripheral regions of the card. Here, however, auxiliary exposure means must be employed to expose the sensing area corresponding to the chosen frame undergoing replication, and the reflection sensing means must be suitably positioned to interrogate this sensing area. By this means a larger image is achieved in a given frame at the expense of added complexity.

The second object of the invention, the ability to detect failure of the flash lamp to fire during replication, is achieved by either of two embodiments. In the first embodiment flash lamp failure is detected by sensing the passage of light from the flash lamp through the sensing area qrst in FIG. 8C. This is achieved by a flash failure sensing circuit 322 (FIG. 1). Immediately prior to triggering the flash pulse 52, the light source 282 is deenergized by the system timing and control circuit 7, and another one-bit latch 306 is set to a "0" on sensing line 326 by a reset pulse sent out on reset line 324. If a light pulse is detected by the photodetector during the transfer operation, either by burnthrough on initial exposure or from a clear sensing area during an annotation, a pulse sent via signal line 318 to the latch 306 triggers it to output a "1" state on sensing line 326. Program branching occurs by the methods previously described; the presence of a "0" on the sensing line 326 immediately after triggering the flash pulse 52 indicates flash failure and causes actuation of a flash failure alarm means 328.

In the alternative embodiment reflection sensing is used to detect flash lamp failure during replication of a previously unexposed frame. Immediately after flash exposure, the sensing cycle is repeated. On this cycle the combination of an open override switch 294, indicating a fresh frame was chosen, and the presence of a "1" on the sensing line 326, indicating that the sensing area is still reflecting, is indicative of flash failure and causes actuation of the flash failure alarm means 328. This actuation is carried out by elementary gating means well known to the art by the flash failure sensing circuit 322. This embodiment, however, has no capability for detection of flash failure during annotation, since the sensing area is invariably clear as a result of the first exposure of the chosen frame. For this reason transmission sensing is preferred.

While for purposes of illustration, various forms of this invention has been disclosed, other forms thereof may become apparent to those skilled in the art upon reference to this disclosure and, therefore, this invention should be limited only by the scope of the appended claims.

We claim:

1. In an annotatable photographic microfiche film recording system for forming and storing images of record copy, said system including means for forming a first image of said copy within a prescribed imaging area of an intermediate photographic film in which any portion of said imaging area can be imaged by radiant energy from said record copy to yield an image upon development in those regions of said imaging area illuminated by said radiant energy, means for replication of said first image as a second image on an annotatable microfiche photographic film by directing radiant energy from a frame illumination means through said imaging area of said intermediate film and onto said microfiche photographic film, said second image being an annotatable permanent record formed by the absorption of said radiant energy as it strikes said microfiche photographic film, said microfiche film having designated frames for receiving said second image at a prescribed location on said microfiche film card, said system further including means for adding an additional image to a previously exposed frame of said microfiche film, the improvement comprising means for exposing a given sensing area on said microfiche photographic film during said replication so that the status of said sensing area after said replication constitutes a permanent indication that the selected frame has been exposed, each of said frames having a unique corresponding sensing area associated therewith, each said corresponding sensing area being disposed so as not to substantially interfere with replication of said record copy, a status sensing means for sensing the status of the corresponding sensing area for a chosen frame before said replication, disabling control means responsive to said status sensing means for disabling said replication means when said status sensing means detects a status of said corresponding sensing area indicative of prior exposure of said chosen frame, means for detecting failure of said frame illumination means to expose said microfiche film comprising said frame illumination means for also exposing said corresponding sensing area by said frame illumination means during exposure, property sensing means for sensing during or after an attempted exposure by said frame illumination means a property of said corresponding sensing area indicative of exposure, failure alarm means for warning of said failure, and failure control means responsive to said property sensing means for activating said failure alarm means when the absence of said property is sensed during or after an attempted replication.

2. The microfiche film recording system as recited in claim 1, wherein each said corresponding sensing area is contained within its associated frame, and said means for exposing a given sensing area and said frame illumination means are the same.

3. The microfiche film recording system as recited in claim 1, wherein said status is a changed reflectivity and said status sensing means is a reflection sensing means.

4. The microfiche film recording system as recited in claim 3, wherein said reflection sensing means comprises a reflection photodetecting means and a sensing illumination means, said sensing illumination means disposed to illuminate said corresponding sensing area at a level below the exposure threshold of said microfiche film, said reflection photodetecting means disposed to sense light from said sensing illumination means reflected off said corresponding sensing area, said disabling control means responding to the output of said reflection photodetecting means.

5. The microfiche film recording system as recited in claim 4, further comprising a backing element for said microfiche film during the exposure thereof by said frame illumination means, said backing element including said reflection sensing means, each said corresponding sensing area being contained within its associated frame.

6. The microfiche film recording system as recited in claims 1 or 3, wherein there is provided operator controlled override means for overriding said disabling control means to permit said adding of an additional image.

7. The microfiche film recording system as recited in claims 1 or 3, further comprising alarm means responsive to disabling of said replication means by said disabling control means.

8. The microfiche film recording system as recited in claim 1, wherein said property is a substantial loss of reflectivity resulting from exposure, and said property sensing means is reflection sensing means, said failure control means responding to said reflection sensing means to activate said failure alarm means when a substantially high reflectivity indicative of exposure failure is detected by said property sensing means after a attempted replication.

9. The apparatus of claims 5 or 8, wherein said status sensing means and said property sensing means are a common sensing means, said disabling control means being responsive to said reflection photodetecting means before an attempted exposure, said failure control means being responsive to said reflection photodetecting means during or after said attempted exposure.

10. The microfiche film recording system as recited in claim 1, wherein said property is the disappearance of opacity during exposure, and said property sensing means is a transmission photodetecting means disposed to sense light from said frame illumination means passing through said corresponding sensing area during the exposure of said associated frame, said failure control means responding to failure to said transmission photodetecting means to detect light from said frame illumination means during an attempted exposure of said associated frame.

11. The microfiche film recording system as recited in claim 10, further comprising a backing element for said microfiche film during the exposure thereof by said frame illumination means, said backing element including said transmission photodetecting means, each said corresponding sensing area being contained within its associated frame.

12. The apparatus of claims 5 or 11, wherein said reflection photodetecting means and said transmission photodetecting means are a common photodetecting means disposed to sense reflected light from said sensing illumination means and transmitted light from said frame illuminating means.

13. In a photographic microfiche film recording system for forming and storing images of record copy, said system including means for forming a first image of said copy within a prescribed imaging area of an intermediate photographic film in which area any portion thereof can be imaged by radiant energy from said record copy to yield an image upon development in those regions of said imaging area illuminated by said radiant energy, means for replication of said first image as a second image on a microfiche photographic film by directing radiant energy from a frame illumination means through said imaging area of said intermediate film and onto said microfiche photographic film, said second image being a permanent record formed by the absorption of said radiant energy as it strikes said microfiche photographic film, said microfiche film having designated frames for receiving said second image at a prescribed location on said microfiche film card, the improvement comprising means for detecting failure of said frame illumination means to expose said microfiche film, said means for detecting failure comprising means for exposing a given sensing area on said microfiche photographic film by said frame illumination means during the exposure of a chosen frame, each of said frames having a unique corresponding sensing area associated therewith, each said corresponding sensing area being disposed so as not to substantially interfere with replication of said record copy, property sensing means for sensing during or after an attempted exposure of a chosen frame a property of said corresponding sensing area indicative of exposure, failure alarm means for warning of said failure, and failure control means responsive to said property sensing means for activating said failure alarm means when the absence of said property is sensed during or after an attempted replication.

14. The microfiche film recording system as recited in claim 13, wherein each said corresponding sensing area is contained within its associated frame.

15. The microfiche film recording system as recited in claim 13, wherein said property is a substantial reduction of reflectivity resulting from exposure, and said property sensing means is a reflection sensing means.

16. The microfiche film recording system as recited in claim 15, wherein said reflection sensing means comprises a reflection photodetecting means and a sensing illumination means, said sensing illumination means disposed to illuminate said corresponding sensing area at a level below the exposure threshold of said microfiche film, said reflection photodetecting means disposed to sense light from said sensing illumination means reflected off said corresponding sensing area, said alarm control means responding to the output of said reflection photodetecting means when a substantially high reflectivity indication of exposure failure is detected by said reflection sensing means during or after an attempted replication.

17. The microfiche film recording system as recited in claim 16, further comprising a backing element for said microfiche film during the exposure thereof by said frame illumination means, said backing element including said reflection sensing means, each said corresponding sensing area being contained within its associated frame.

18. The microfiche film recording system as recited in claim 13, wherein said property is the disappearance of opacity during exposure, and said property sensing means is a transmission photodetecting means disposed to sense light from said frame illumination means passing through said corresponding sensing area during the exposure of said associated frame, said failure control means responding to failure of said transmission photodetecting means to detect light from said frame illumination means during an attempted exposure of said associated frame.

19. The microfiche film recording system as recited in claim 18, further comprising a backing element for said microfiche film during the exposure thereof by said frame illumination means, said backing element including said transmission photodetecting means, each said corresponding sensing area being contained within its associated frame.

* * * * *

UNITED STATES PATENT AND TRADEMARK OFFICE
CERTIFICATE OF CORRECTION

PATENT NO. : 4,348,104
DATED : September 7, 1982
INVENTOR(S) : Herbert C. Ovshinsky It is certified that error appears in the above—identified patent and that said Letters Patent is hereby corrected as shown below:

Column 1, line 14, change "applicants" to --applicant--.
Claim 8, column 12, line 5, delete "a" and insert --an--.
Claim 10, column 12, line 21, delete "to" (second occurrence) and insert --of--.

Signed and Sealed this

Ninth Day of August 1983

[SEAL]

Attest:

GERALD J. MOSSINGHOFF

Attesting Officer　　Commissioner of Patents and Trademarks